(12) United States Patent
Chen

(10) Patent No.: US 6,942,940 B2
(45) Date of Patent: Sep. 13, 2005

(54) SYSTEM FOR GENERATING ELECTRICITY

(75) Inventor: Tan-Ping Chen, Walnut Creek, CA (US)

(73) Assignee: Gas Research Institute, Des Plaines, IL (US)

( * ) Notice: Subject to any disclaimer, the term of this patent is extended or adjusted under 35 U.S.C. 154(b) by 308 days.

(21) Appl. No.: 10/138,107

(22) Filed: May 3, 2002

(65) Prior Publication Data

US 2003/0207163 A1 Nov. 6, 2003

(51) Int. Cl.$^7$ .......................... H01M 8/04; H01M 8/12; H01M 8/18; H01M 2/14
(52) U.S. Cl. .............................. 429/26; 429/17; 429/19; 429/38; 429/39
(58) Field of Search .............................. 429/17, 19, 26, 429/38, 39

(56) References Cited

U.S. PATENT DOCUMENTS

| | | | | |
|---|---|---|---|---|
| 4,670,359 A | * | 6/1987 | Beshty et al. | 429/17 |
| 5,470,671 A | * | 11/1995 | Fletcher et al. | 429/26 |
| 5,541,015 A | * | 7/1996 | Tajima et al. | 429/26 |
| 6,489,050 B1 | | 12/2002 | Ruhl et al. | |

FOREIGN PATENT DOCUMENTS

EP       1 202 366 A2    5/2002

OTHER PUBLICATIONS

Chen, Tan–Ping et al., "System Analysis of Solid Oxide Fuel Cell Unit", *Electrochemical Proceedings*, vol. 97–18, pp. 69–78 (1997).

* cited by examiner

*Primary Examiner*—Patrick Joseph Ryan
*Assistant Examiner*—Julian Mercado
(74) *Attorney, Agent, or Firm*—Mark E. Fejer

(57) ABSTRACT

A system for generating electricity which includes an internal manifold fuel cell stack having an anode fuel gas duct, an anode exhaust gas duct, a cathode air duct and a cathode exhaust duct and a plenum having a fuel gas inlet, an anode exhaust gas outlet, an air inlet and a cathode exhaust gas outlet, which plenum is adapted to deliver a fuel gas and air to the internal manifold fuel cell stack. At least one air preheat panel is provided having two parallel planar surfaces disposed proximate and parallel to the internal manifold fuel cell stack and forming at least one air duct between the two parallel planar surfaces, which at least one air duct extends parallel to the two planar surfaces and has at least one cold air inlet and at least one preheated air outlet. The preheated air outlet is in fluid communication with the cathode air duct. In accordance with one embodiment, the internal manifold fuel cell stack, plenum and the at least one air preheat panel are all disposed within a housing.

17 Claims, 5 Drawing Sheets

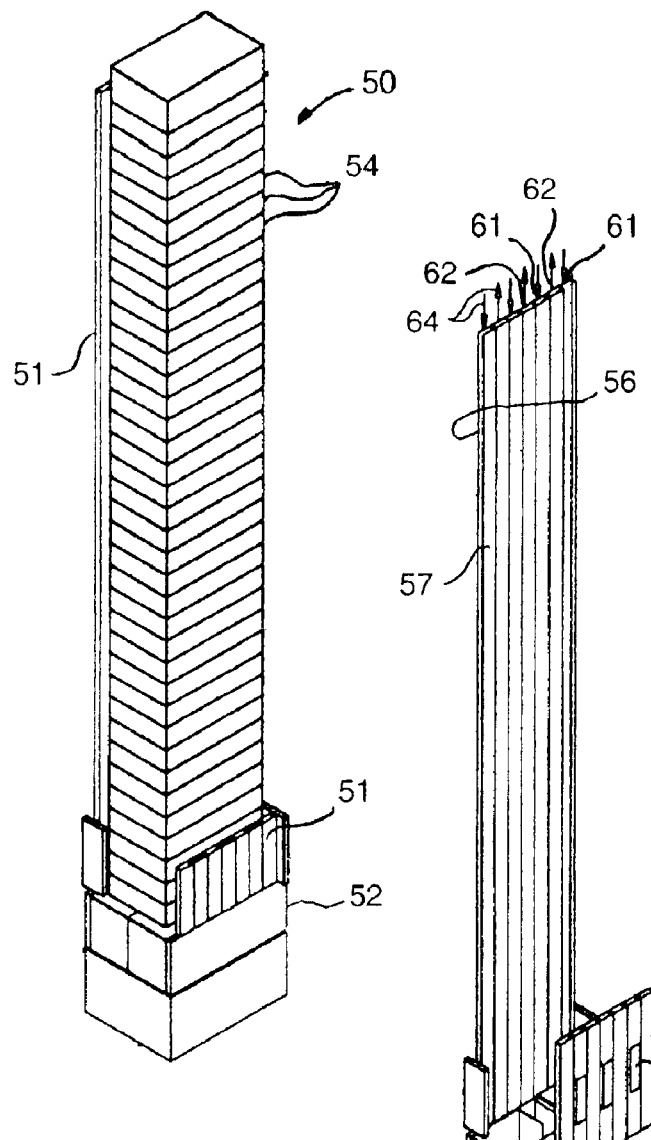
Fig. 3
Fig. 4
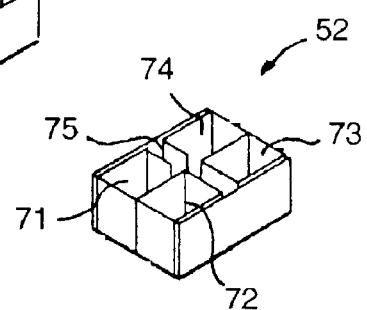
Fig. 5

SYSTEM FOR GENERATING ELECTRICITY

BACKGROUND OF THE INVENTION

1. Field of the Invention

This invention relates to a system for generating electricity. More particularly, this invention relates to a system comprising fuel cell electrical output units having a configuration that results in more efficient electricity generation at lower costs than known systems. Although applicable to different types of fuel cells, the disclosed system is particularly suitable for use with planar fuel cells, in particular, planar solid oxide fuel cells.

Generally, fuel cell electrical output units are comprised of a stacked multiplicity of individual fuel cell units separated by bi-polar electronically conductive separator plates. Individual fuel cell units are sandwiched together and secured into a single staged unit to achieve desired fuel cell energy output. Each individual cell generally includes an anode electrode and a cathode electrode, a common electrolyte, and fuel and oxidant gas sources. Both fuel and oxidant gases are introduced through manifolds, either internal or external to the fuel cell stack, to the respective reactant chambers between the separator plate and the electrolyte.

2. Description of Related Art

Solid oxide fuel cells have grown in recognition as a viable high temperature fuel cell technology. There is no liquid electrolyte with its attending metal corrosion and electrolyte management problems. Rather, the electrolyte of the cells is made primarily from solid ceramic materials so as to survive the high temperature environment. The operating temperature of greater than about 600° C. allows internal reforming to convert hydrocarbon fuels into hydrogen required for the reaction, promotes dell reactions with non-precious materials, and produces high quality by-product heat for cogeneration or for use in a bottoming cycle. The high temperature of the solid oxide fuel cell, however, places stringent requirements on its materials. Because of the high operating temperatures of conventional solid oxide fuel cells (approximately 1000° C.), the materials used in the cell components are limited by chemical stability in oxidizing and reducing environments, chemical stability of contacting materials, conductivity, and thermo-mechanical compatibility.

Planar solid oxide fuel cells have the potential to be more efficient and lower in cost than tubular designs because the cells used have shorter current paths and are simpler to manufacture. However, as suggested above, it is difficult to find suitable low-cost materials for the sealant and interconnect for use at the 1000° C. solid oxide fuel cell operating temperature. Thus, to enable the use of lower cost materials, it is desirable that the operating temperature of the solid oxide fuel cells be reduced.

An effective heat integration between fuel cell stack heat removal and air preheating has been a major challenge for the solid oxide fuel cell. Standard heat integration schemes employed by conventional systems use the cathode gas for the heat removal and preheat the air feed by heat exchange with the cathode exhaust gas. As the temperature rise of the cathode gas in the stacks is limited (usually less than 100° C.), the required cathode flow for the stack heat removal is very large. Typically, a stoichiometric air ratio of 4–5 is necessary to provide the cathode flow required for the heat removal. This large air flow significantly increases the air preheater size. The large size, in conjunction with the high air discharge temperature required, significantly increases the air preheater cost. This is one major reason for the high cost of solid oxide fuel cell systems. The large air flow also increases the system pressure drop. The combined effect of large flow and high pressure drop increases the air blower size and the auxiliary power consumption. Consequently, the efficiency of the system is reduced.

SUMMARY OF THE INVENTION

Accordingly, it is one object of this invention to provide a solid oxide fuel cell system capable of operating at temperatures less than the 1000° C. operating temperature of conventional solid oxide fuel cells.

It is another object of this invention to provide a system for generating electricity utilizing solid oxide fuel cells which is more efficient than conventional systems employing solid oxide fuel cells.

It is a further object of this invention to provide a solid oxide fuel cell system that does not depend on the cathode gas for removal of heat from the fuel cell stack.

It is yet another object of this invention to provide a solid oxide fuel cell system in which the air flow required for heat removal is smaller than in conventional systems, thereby enabling the use of smaller air preheaters and a reduction in auxiliary power consumption.

These and other objects of this invention are addressed by a system for generating electricity comprising at least one internal manifold fuel cell stack comprising a plurality of fuel cell units, each of which fuel cell units comprises an anode electrode, a cathode electrode and an electrolyte disposed between said anode electrode and said cathode electrode. A separator plate is disposed between the anode electrode of one fuel cell unit and the cathode electrode of an adjacent fuel cell units. The system further comprises gas delivery means for providing fuel gas to the anode electrode and air to the cathode electrode, gas removal means for removing anode exhaust gas and cathode exhaust gas from the fuel cell stack, and stack heat removal means for removing heat from the fuel cell stack. The stack heat removal means comprises at least one air preheat panel having two parallel planar surfaces disposed proximate and substantially parallel to the fuel cell stack. The air preheat panel forms at least one interior air duct between the two parallel planar surfaces, which air duct extends parallel to the two planar surfaces and has at least one cold air inlet and at least one preheated air outlet.

The gas delivery means comprises a plenum having a fuel gas inlet, an anode exhaust gas outlet, an air inlet and a cathode exhaust gas outlet. The air inlet is in fluid communication with the at least one air duct disposed in the interior of the air preheat panel. The plenum further comprises an anode inlet duct in fluid communication with the fuel gas inlet, an anode exhaust gas duct in fluid communication with the anode exhaust gas outlet, a cathode inlet duct in fluid communication with the air inlet, and a cathode exhaust gas duct in fluid communication with the cathode exhaust gas outlet. In accordance with one particularly preferred embodiment, the plenum further comprises communication means for providing fluid communication between the anode exhaust gas duct and the cathode inlet duct.

In accordance with one embodiment of this invention, the gas delivery means comprises at least one preburner having a fuel inlet in fluid communication with the anode exhaust gas duct and the at least one preheated air outlet of the air preheat panel. The preburner further comprises a combustion products outlet, which is in fluid communication with the cathode inlet duct of the plenum. In accordance with a particularly preferred embodiment, the preburner is integral with the plenum.

In operation, the anode exhaust gas from the fuel cell stack is split into two streams, one to an ejector and the other to the preburner. The cathode exhaust gas, after heat recovery for a pre-reformer/anode preheater, is discharged to the atmosphere. Plenty of high temperature heat is, thus, available in this stream for further generation of steam, hot water, or power, if desired. All the high temperature system components are preferably housed in an enclosure to minimize high temperature pipe penetration through the enclosure wall. DC power produced by the stacks is converted to AC power in an inverter.

BRIEF DESCRIPTION OF THE DRAWINGS

These and other objects and features of this invention will be better understood from the following detailed description taken in conjunction with the drawings wherein:

FIG. 3 is a diagram of an assembled fuel cell stack in accordance with one embodiment of this invention;

FIG. 4 is a diagram showing the plenum and air preheat ducts used for removing heat from the fuel cell stack in accordance with one embodiment of this invention;

FIG. 5 is a perspective view of a plenum in accordance with one embodiment of this invention;

DETAILED DESCRIPTION OF THE PRESENTLY PREFERRED EMBODIMENTS

Figure 1:
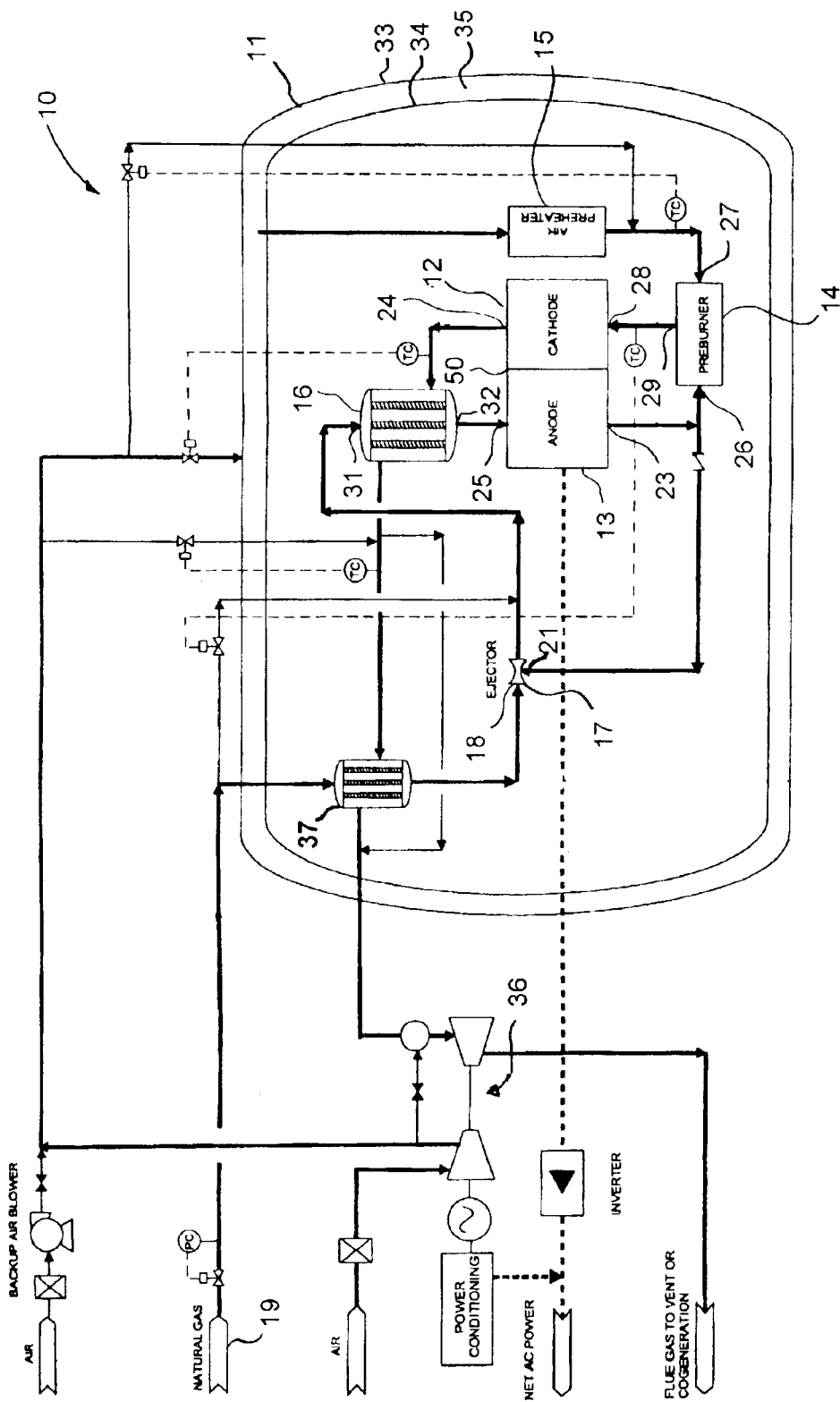
FIG. 1 is a schematic diagram of the system for generating electricity in accordance with one embodiment of this invention.
Figure 2:
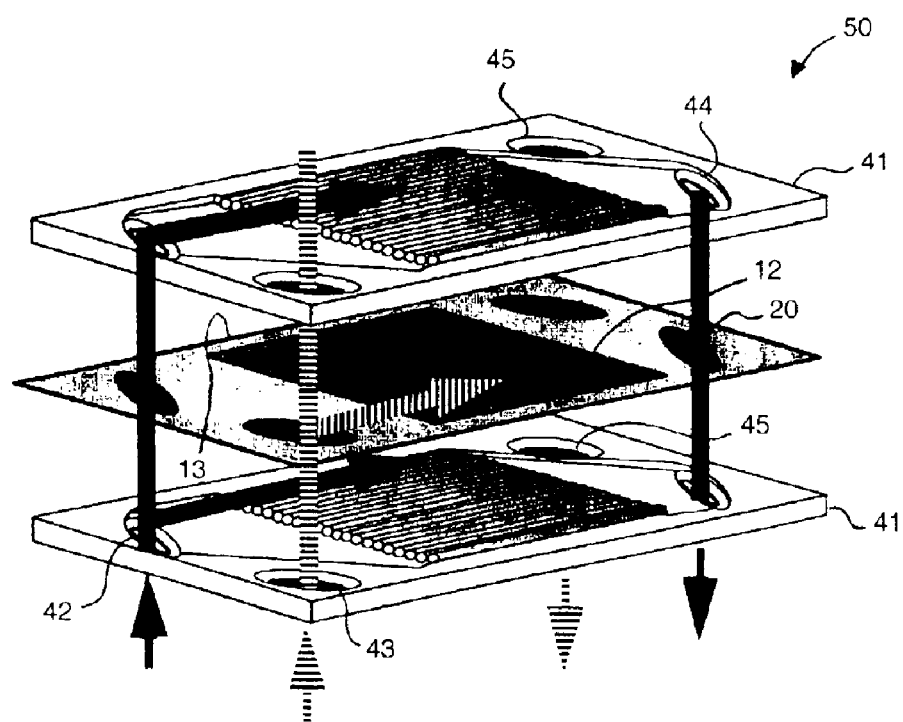
FIG. 2 is a diagram of a portion of an internal manifold fuel cell stack suitable for use in the system of this invention.

The system 10 for generating electricity in accordance with this invention is applicable to both ambient pressure and pressurized operations of the fuel cells employed in the system, preferably solid oxide fuel cells. The system for pressurized operation is shown in FIG. 1 and comprises at least one internal manifold fuel cell stack 50 comprising a plurality of fuel cell units 54 (shown in FIG. 3), each said fuel cell unit comprising an anode electrode 13, a cathode electrode 12 and an electrolyte 20 disposed between the anode electrode 13 and the cathode electrode 12 (shown in FIG. 2). Disposed between the anode electrode 13 of one fuel cell unit and the cathode electrode 12 of an adjacent fuel cell unit is a bipolar separator plate 41, as shown in FIG. 2. Internal manifold fuel cell stack 50 forms a plurality of ducts for input, transport and removal of gaseous streams associated with operation of the fuel cell stack. As shown in FIG. 2, the internal manifold fuel cell stack forms an anode gas duct 42 through which a fuel gas is transported to the anode electrode 13, a cathode gas duct 43 through which an oxidizing gas, preferably air, is transported to the cathode electrode 12, an anode exhaust gas duct 44 through which anode exhaust gases are removed from the fuel cell stack, and a cathode exhaust gas duct 45 through which cathode exhaust gases are removed from the fuel cell stack. Fuel gas is introduced by gas delivery means into anode gas duct through fuel gas inlet 25, which is in fluid communication with anode gas duct 42; air is introduced by said gas delivery means into cathode gas duct 43 through cathode air inlet 28, which is in fluid communication with cathode gas duct 43; anode exhaust gas is exhausted from fuel cell stack 50 through anode exhaust gas outlet 23, which is in fluid communication with anode exhaust gas duct 44; and cathode exhaust gas is exhausted from fuel cell stack 50 through cathode exhaust gas outlet 24, which is in fluid communication with cathode exhaust gas duct 45.

A key element of this invention is the removal of heat from the fuel cell stack. To provide for the removal of heat from fuel cell stack 50, the system for generation of electricity in accordance with this invention comprises at least one air preheater 15 in the form of air preheat panel 51, shown in FIG. 3. Air preheat panel 51, which comprises two planar surfaces 56, 57, shown in FIGS. 3 and 4, is disposed proximate and substantially parallel to fuel cell stack 50 and forms at least one air duct 61 between the two parallel planar surfaces 56, 57. The air duct 61 extends parallel to the two planar surfaces, has at least one cold air inlet and at least one preheated air outlet and is in fluid communication with the gas delivery means. The cold air inlet is preferably in the form of at least one slot 63 disposed on one side of air preheat panel 51. In accordance with one preferred embodiment of this invention, air preheat panel 51 forms a plurality of air ducts 61, 62, which air ducts are alternating upflow and downflow ducts, as indicated by the arrows 64 in FIG. 4. The preheated air flows from the air preheat panel 51 into the plenum 52.

Figure 6A:
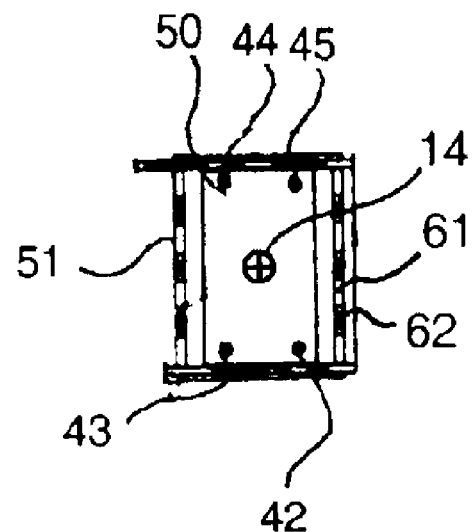
FIG. 6a is a plan view of a plan view of a transverse section of a fuel cell stack with air preheater panels in accordance with one embodiment of this invention.
Figure 6B:
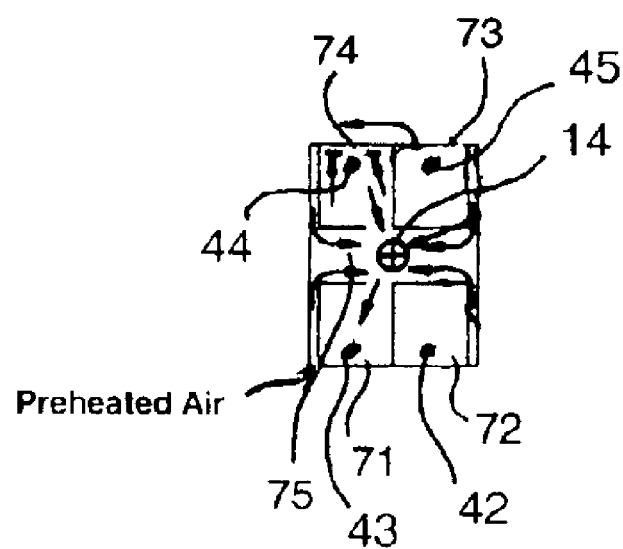
FIG. 6b is a plan view of a plan view of a transverse section of a plenum for a fuel cell stack in accordance with one embodiment of this invention.

In accordance with one particularly preferred embodiment of this invention, the gas delivery means comprises a plenum 52 having a fuel gas inlet, an anode exhaust gas outlet, an air inlet and a cathode exhaust gas outlet. The air inlet is in fluid communication with the at least one air duct 61 formed by air preheat panel 51. As shown in FIGS. 5, 6a and 6b, plenum 52 comprises anode inlet duct 72, which is in fluid communication with anode gas duct 42 of internal manifold fuel cell stack 50; cathode inlet duct 71, which is in fluid communication with cathode gas duct 43 of internal manifold fuel cell stack 50; anode outlet duct 74, which is in fluid communication with anode exhaust gas duct 44 of internal manifold fuel cell stack 50; and cathode outlet duct 73, which is in fluid communication with cathode exhaust gas duct 45 of internal manifold fuel cell stack 50. In accordance with one embodiment of this invention, plenum 52 further comprises communication means for providing fluid communication between the anode outlet duct 74 and the cathode inlet duct 71, thereby enabling introduction of a portion of the exhausted anode gases produced by the fuel cell stack into the cathode gas duct 43 of the fuel cell stack.

As previously stated, the system of this invention comprises gas delivery means for providing fuel gas to the anode electrode 13 and oxidant (air) to the cathode electrode 12. In accordance with one particularly preferred embodiment of this invention, the gas delivery means comprises at least one preburner 14, as shown in FIG. 1, having a fuel inlet 26 and a preheated air inlet 27. Fuel inlet 26 is in fluid communication with anode exhaust gas outlet 23 through which anode exhaust gas in anode exhaust gas duct 44 is exhausted. Fuel inlet 26 is also in fluid communication with the preheated air inlet 27, which, in turn, is in fluid communication with the preheated air outlet of air preheater 15. Preburner 14 further comprises a combustion products outlet 29, which is in fluid communication with cathode air inlet 28. By virtue of this arrangement, preheated air from preheater 15 is mixed with anode exhaust gas, which mixture is burned to produce combustion products, which, in turn, are introduced through cathode air inlet 28 into cathode gas duct 43. In accordance with one particularly preferred embodiment of this invention, the functional aspects of the preburner are achieved within plenum 52, whereby the preburner constitutes an integral part of plenum 52. This functionality arises from the fluid communication between anode outlet duct 74 and the cathode inlet duct 71 as previously described.

In accordance with one preferred embodiment of this invention, the system of this invention further comprises pre-reformer/anode preheater 16 having a natural gas inlet 31 in fluid communication with a natural gas supply 19 and a reformed gas outlet 32 in fluid communication with fuel gas inlet 25 of anode electrode 13. The natural gas introduced into pre-reformer/anode preheater 16 is partially reformed to ensure sufficient hydrogen availability for the fuel cell reactions at the cell entrance to generate sufficient heat for the highly endothermic internal reforming reaction. The pre-reformer/anode preheater also heats the partially reformed gas to the anode temperature at fuel gas inlet 25. Heat required for the pre-reforming and anode preheating is provided by the recovery of waste heat from cathode exhaust gas exhausted through cathode exhaust gas outlet 24.

In accordance with one embodiment of this invention, the system 10 comprises an ejector 17 having an ejector natural gas inlet 18, which is in fluid communication with natural gas supply 19, into which a portion of the natural gas flowing into pre-reformer/anode preheater 16 is fed as a motive gas to induce an anode gas recycle. Ejector 17 further comprises an anode gas recycle inlet 21 for receiving the anode gas recycle. The anode gas recycle provides an internal steam supply for the pre-reformer/anode preheater 16 by using the fuel cell reaction product water in the anode exhaust gas. Because ejector 17 has very little turndown capability, the natural gas flow to the ejector is maintained constant, regardless of the plant load. When the natural gas demand reduces as the plant load decreases, the amount of natural gas bypassing the ejector is cut back to meet the required flow reduction.

In accordance with a further embodiment of this invention, system 10 comprises a natural gas feed preheater/ desulfurizer 37 for removal of sulfur from the natural gas feed prior to input to the anode electrode. During system start-up, there is no hot gas available to heat the desulfurizer to operating temperature. In this case, the natural gas feed is desulfurized at room temperature by an activated carbon bed (not shown).

In accordance with one particularly preferred embodiment of this invention, fuel cell stack 50, plenum 52 and air preheater 15 are disposed within housing 11, as shown in FIG. 1. By so doing, the number of high temperature pipe penetrations through the housing wall, which can be very expensive due to the requirement that the housing be thermally insulated from the pipes at the penetration points, may be kept to a minimum. In accordance with one preferred embodiment, the housing 11 comprises a double wall structure having an outer wall 33 and an inner wall 34, said outer wall and said inner wall being spaced apart so as to form an annular space 35 therebetween. Annular space 35 is in fluid communication with an air supply, shown in FIG. 1 as turbogenerator 36, whereby air provided by turbogenerator 36 flows through annular space 35 before it enters the interior space of housing 11. This flow of air keeps the housing cool, as a result of which the housing walls can be constructed of low cost carbon steel and there is minimal or no need for thermal insulation. In addition, the air may be used to recover heat losses from the high temperature equipment disposed within housing 11.

Figure 7:
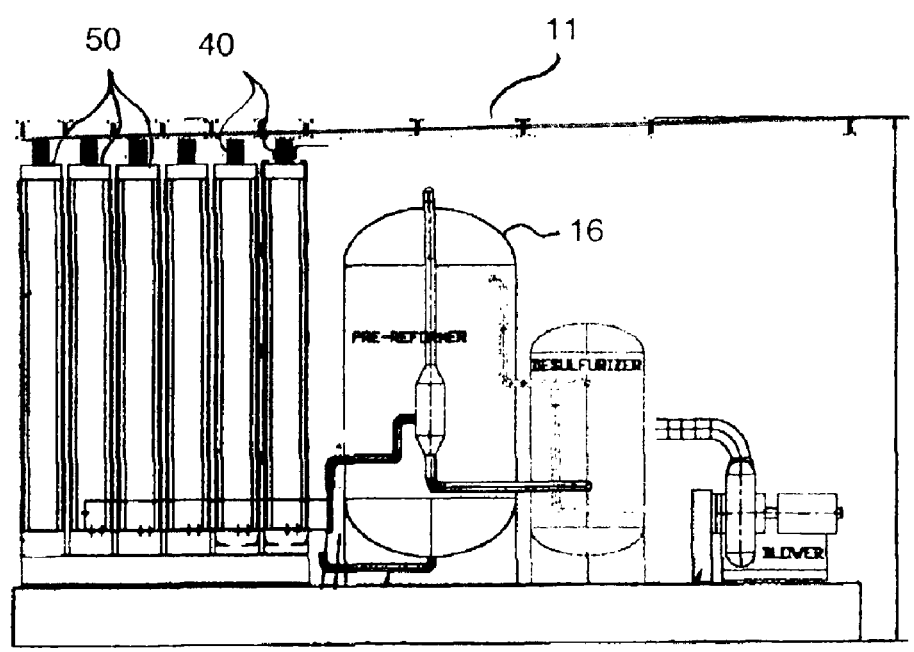
FIG. 7 is a side view of a system for generating electricity in accordance with one embodiment of this invention.

In accordance with one preferred embodiment of this invention, internal manifold fuel cell stacks 50 are clamped by mechanical springs 40, as shown in FIG. 7. The air from turbogenerator 36 enters housing 11 by flushing through mechanical springs 40, thereby shielding mechanical springs 40 from the high temperature environment in housing 11. Inside housing 11, the air also flows through the enclosure space to air preheat panel slots 63 (FIG. 4). Introduction of the air into housing 11 in this manner eliminates the piping requirements for the air of conventional systems and prevents any accumulation of combustible gases leaked from the stacks and other equipment by burning off these gases. As a result, a separate purge gas for housing 11 is not necessary. And, finally, no hydrogen can be present outside of the housing 11, as a result of which there is no need for the electrical equipment disposed outside of the housing 11, such as air blower motors, to be hydrogen-explosion proof. For safety, the air temperature and combustible concentration inside housing 11 are continuously monitored to detect any significant gas leakage from the stacks and other equipment. When a significant leakage is detected, the system is shutdown.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

I claim:

1. In a system for generating electricity comprising at least one internal manifold fuel cell stack comprising a plurality of fuel cell units, each said fuel cell unit comprising an anode electrode, a cathode electrode and an electrolyte disposed between said anode electrode and said cathode electrode, a separator plate disposed between said anode electrode of one said fuel cell unit and said cathode electrode of an adjacent said fuel cell unit, gas delivery means for providing fuel gas to said anode electrode and oxidant to said cathode electrode, gas removal means for removing anode exhaust gas and cathode exhaust gas from said fuel cell stack, and stack beat removal means for removing heat from said fuel cell stack, the improvement comprising:

said stack heat removal means comprising at least one air preheat panel having two planar surfaces disposed proximate and substantially parallel to a stacking direction of said fuel cell stack and forming at least one air duct between said two parallel planar surfaces and extending parallel to said two planar surfaces having at least one cold air inlet and at least one preheated air outlet.

2. A system in accordance with claim 1, wherein said at least one air duct is in fluid communication with said gas delivery means.

3. A system in accordance with claim 2, wherein said gas delivery means comprises a plenum having a fuel gas inlet, an anode exhaust gas outlet, an air inlet and a cathode exhaust gas outlet, said air inlet in fluid communication with said at least one air duct.

4. A system in accordance with claim 3, wherein said plenum comprises an anode inlet duct in fluid communication with said fuel gas inlet, an anode exhaust gas duct in fluid communication with said anode exhaust gas outlet, a cathode inlet duct in fluid communication with said air inlet, and a cathode exhaust gas duct in fluid communication with said cathode exhaust gas outlet.

5. A system in accordance with claim 4, wherein said plenum further comprises communication means for providing fluid communication between said anode exhaust gas duct and said cathode inlet duct.

6. A system in accordance with claim 5, wherein said fuel cell stack, said plenum and said air preheater panel are disposed in a housing.

7. A system in accordance with claim 6, further comprising a pre-reformer having a pre-reformer inlet in fluid communication with said anode exhaust gas outlet, and an anode preheater adapted to heat a reformed fuel gas produced by said pre-reformer to an anode inlet temperature, said pre-reformer and said anode preheater disposed within said housing.

8. A system in accordance with claim 4, wherein said gas delivery means comprises at least one pre-burner having a fuel inlet in fluid communication with said anode exhaust gas duct and said at least one preheated air outlet and a combustion products outlet in fluid communication with said cathode inlet duct.

9. A system in accordance with claim 8, wherein said pre-burner is integral with said plenum.

10. A system in accordance with claim 1, wherein said at least one air preheat panel forms a plurality of said air ducts, said air ducts being alternating upflow and downflow ducts.

11. A system in accordance with claim 1, wherein said at least one cold air inlet is in a form of a side slot disposed on one side of said at least one air preheat panel.

12. A system for generating electricity comprising:

an internal manifold fuel cell stack having an anode fuel gas duct, an anode exhaust gas duct, a cathode air duct and a cathode exhaust duct;

a plenum having a fuel gas inlet, an anode exhaust gas outlet, an air inlet and a cathode exhaust gas outlet, said plenum adapted to deliver a fuel gas and air to said internal manifold fuel cell stack;

at least one air preheat panel having two parallel planar surfaces disposed proximate and parallel to a stacking direction of said internal manifold fuel cell stack and forming at least one air duct between said two parallel planar surfaces, said at least one air duct extending parallel to said two planar surfaces and having at least one cold air inlet and at least one preheated air outlet, said preheated air outlet being in fluid communication with said cathode air duct; and a housing fully enclosing said internal manifold fuel cell stack, said plenum and said at least one air preheat panel.

13. A system in accordance with claim 12 further comprising a pre-burner disposed within said housing having a fuel inlet in fluid communication with said anode exhaust gas duct and said preheated air outlet.

14. A system in accordance with claim 13, wherein said pre-burner is integral with said plenum.

15. A system in accordance with claim 12, wherein said at least one air preheat panel forms a plurality of said air ducts, said air ducts arranged to provide alternating upflow and downflow of air.

16. A system in accordance with claim 12 further comprising a pre-reformer and an anode preheater disposed within said housing, said pre-reformer having a pre-reformer inlet in fluid communication with said anode exhaust gas outlet and said anode preheater adapted to heat a reformed fuel gas produced by said pre-reformer to an anode inlet temperature.

17. A system in accordance with claim 12, wherein said housing forms an opening in fluid communication with an air supply whereby air is introduced into an interior of said housing.

* * * * *